(12) United States Patent
Ronan et al.

(10) Patent No.: US 10,113,936 B2
(45) Date of Patent: Oct. 30, 2018

(54) CLOSED-LOOP ENGINE TESTING SYSTEM

(71) Applicant: Rolls-Royce Corporation, Indianapolis, IN (US)

(72) Inventors: Thomas J. Ronan, Mooresville, IN (US); Fred Steinhoff, Indianpolis, IN (US); Edward Tatnall, Indianpolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 117 days.

(21) Appl. No.: 15/133,022

(22) Filed: Apr. 19, 2016

(65) Prior Publication Data
US 2016/0349148 A1    Dec. 1, 2016

Related U.S. Application Data

(60) Provisional application No. 62/169,142, filed on Jun. 1, 2015.

(51) Int. Cl.
*G01M 15/14* (2006.01)
*F01D 17/02* (2006.01)

(52) U.S. Cl.
CPC ............. *G01M 15/14* (2013.01); *F01D 17/02* (2013.01)

(58) Field of Classification Search
CPC ................................. G01M 15/14; F01D 17/02
USPC ...... 73/112.01, 116.01–116.11, 862, 862.642
See application file for complete search history.

(56) References Cited

U.S. PATENT DOCUMENTS

| | | | | |
|---|---|---|---|---|
| 2,272,678 | A | * | 2/1942 | Morris ...................... H02P 5/46 318/78 |
| 2,993,369 | A | * | 7/1961 | Bonomo ................. G01L 3/245 73/862.28 |
| 3,174,284 | A | | 3/1965 | McCarthy |
| 3,195,349 | A | | 7/1965 | Hage |
| 3,683,683 | A | * | 8/1972 | Demidov .............. G01M 15/02 374/142 |
| 3,969,931 | A | * | 7/1976 | Lanning ................ G01M 10/00 73/114.15 |
| 6,138,081 | A | | 10/2000 | Olejack et al. |
| 6,434,454 | B1 | * | 8/2002 | Suzuki .................. G01M 15/02 701/32.9 |
| 7,735,363 | B2 | | 6/2010 | Mainville |
| 8,191,410 | B2 | | 6/2012 | Hansen et al. |
| 2006/0106526 | A1 | * | 5/2006 | Sugita ................. G01M 15/044 701/114 |
| 2008/0295587 | A1 | * | 12/2008 | Pruszenski ............. G01L 5/133 73/116.05 |
| 2010/0251811 | A1 | * | 10/2010 | Akiyama .............. G01M 15/02 73/116.05 |
| 2012/0226474 | A1 | | 9/2012 | Sanchez et al. |
| 2012/0285228 | A1 | * | 11/2012 | Grunbacher ........ G01M 15/044 73/116.05 |
| 2014/0019081 | A1 | * | 1/2014 | Suzuki .................. G01M 15/02 702/113 |
| 2016/0139002 | A1 | * | 5/2016 | Akiyama ............ G01M 13/025 73/115.01 |

* cited by examiner

*Primary Examiner* — Son Le
*Assistant Examiner* — Marrit Eyassu
(74) *Attorney, Agent, or Firm* — McCracken & Gillen LLC

(57) ABSTRACT

According to one aspect, a system for testing an engine includes a dynamometer coupled to the engine. The dynamometer is responsive to a control signal. The system further includes a controller that derives the control signal from an engine operation parameter.

16 Claims, 11 Drawing Sheets

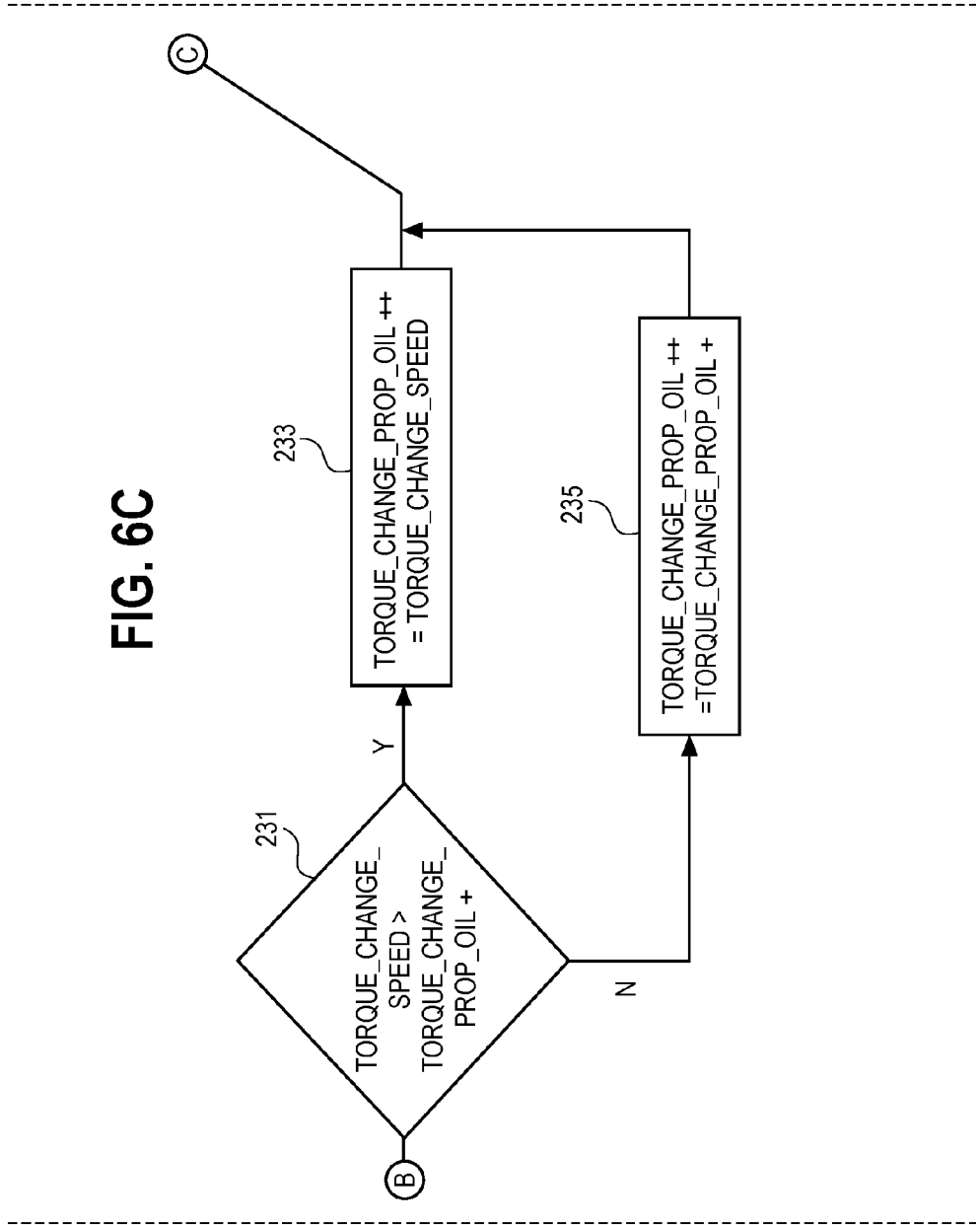

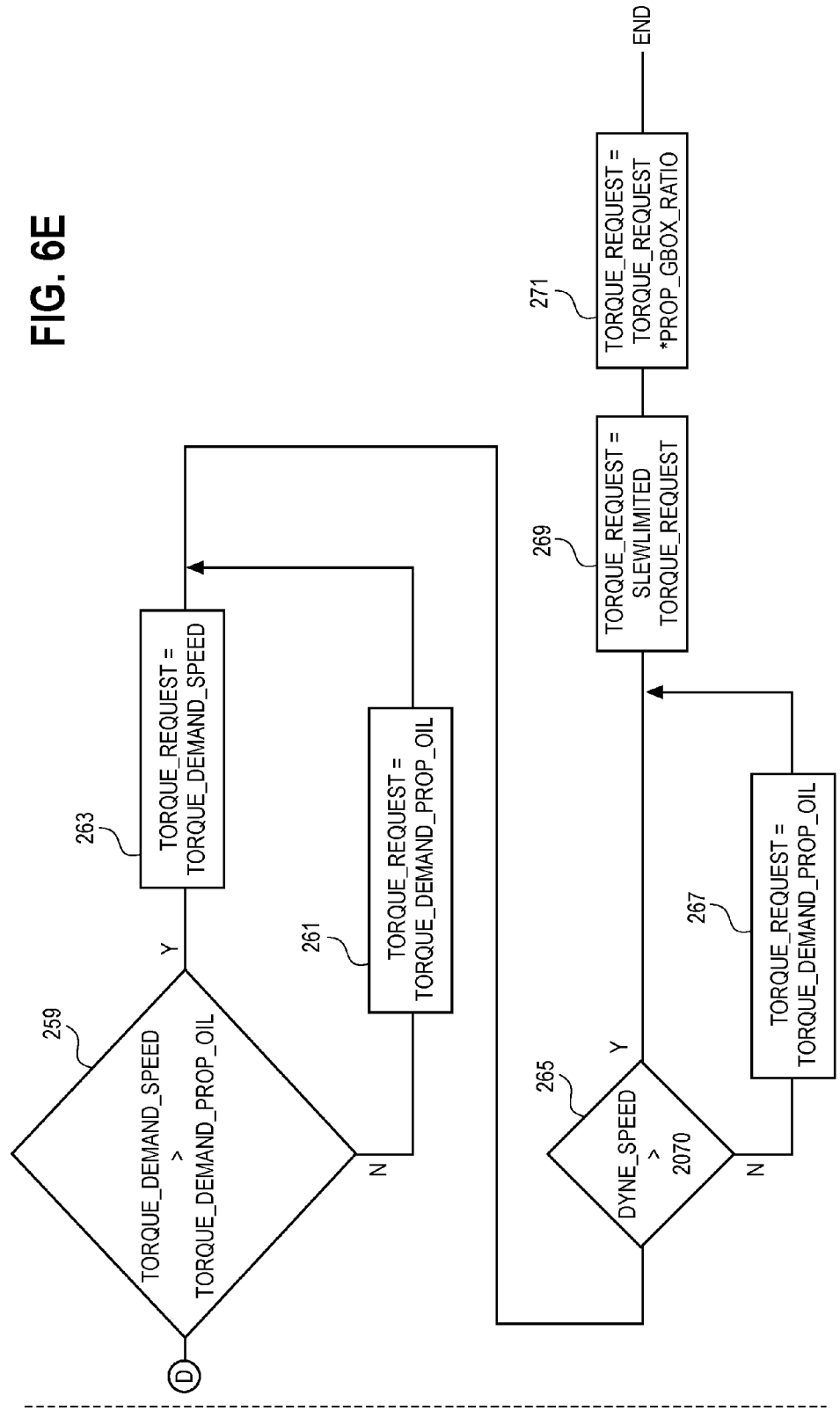

CLOSED-LOOP ENGINE TESTING SYSTEM

CROSS REFERENCE TO RELATED APPLICATIONS

The present application claims the benefit of U.S. Provisional Application No. 62/169,142, filed Jun. 1, 2015, entitled "Closed-Loop Engine Testing System" (C0537/RCA11336), the entire contents of which is incorporated herein by reference.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to testing of engines.

BACKGROUND

Engines frequently need to be tested after they have been manufactured and before they are transported to an original equipment or other airframe manufacturer. A variety of engine features are tested including the operation of the engine and the control systems of the engine. It is important that the engine meets both operational benchmarks and have functioning control systems before the engine is incorporated into an end product. If an engine is not capable of operating in expected ranges or the control systems of the engine are fault, the purchaser of the engine may receive a product of inferior quality.

Current testing procedures for engines, for example turboshaft or turboprop engines, include coupling a propeller or rotor to the engine and observing the power produced by the engine. Alternative testing procedures for engines, such as turboprop engines, involve testing each engine twice. The engine is arranged in two different configurations for each of the two tests. Further, the two test configurations often make use of separate and different test stands that facilitate the testing procedures for a particular configuration and monitor the outcomes. One test may be undertaken on a dynamometer test stand to acquire performance measurements regarding the engine. A second test may be performed on a propeller stand with the engine attached to a slave propeller. For the second test the engine is usually configured in its final delivery configuration. The final delivery configuration may include adding a propeller reduction gearbox and a propeller control system.

The preparation of engines for testing is an expensive and time-consuming process. Numerous parts, sensors, and safety mechanisms need to be coupled to the engine for each test. Expense is incurred during the preparation of the engine for each test as well as during the time spent switching the engine from one test stand to another. Further expense is incurred as a result of maintaining two test stands.

SUMMARY

According to one aspect, a system for testing an engine includes a dynamometer coupled to the engine and responsive to a control signal. The system further includes a controller that derives the control signal from an engine operation parameter.

According to another aspect, a method for testing an engine includes coupling the engine to a dynamometer. The method further includes controlling the dynamometer with a control signal and deriving the control signal from an engine operation parameter.

Other aspects and advantages will become apparent upon consideration of the following detailed description and the attached drawings wherein like numerals designate like structures throughout the specification.

BRIEF DESCRIPTION OF THE DRAWINGS

FIGS. 6A-6E, when joined sequentially along the similarly lettered lines from left to right together comprise a detailed flow chart of the programming executed by the dynamometer control of FIG. 5 to implement an embodiment of the closed-loop engine testing system.

DETAILED DESCRIPTION

Figure 1:
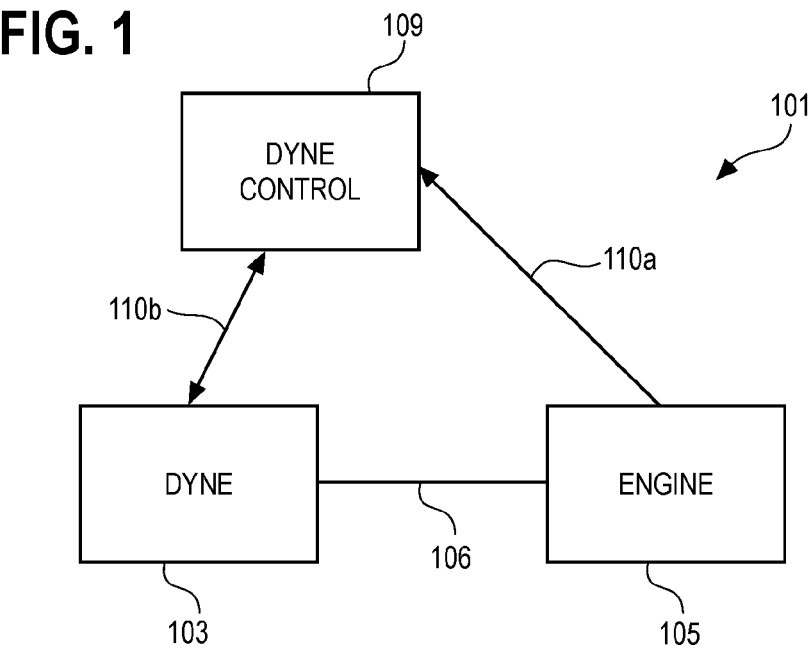
FIG. 1 is a block diagram of an embodiment of a closed-loop engine testing system.
Figure 4A:
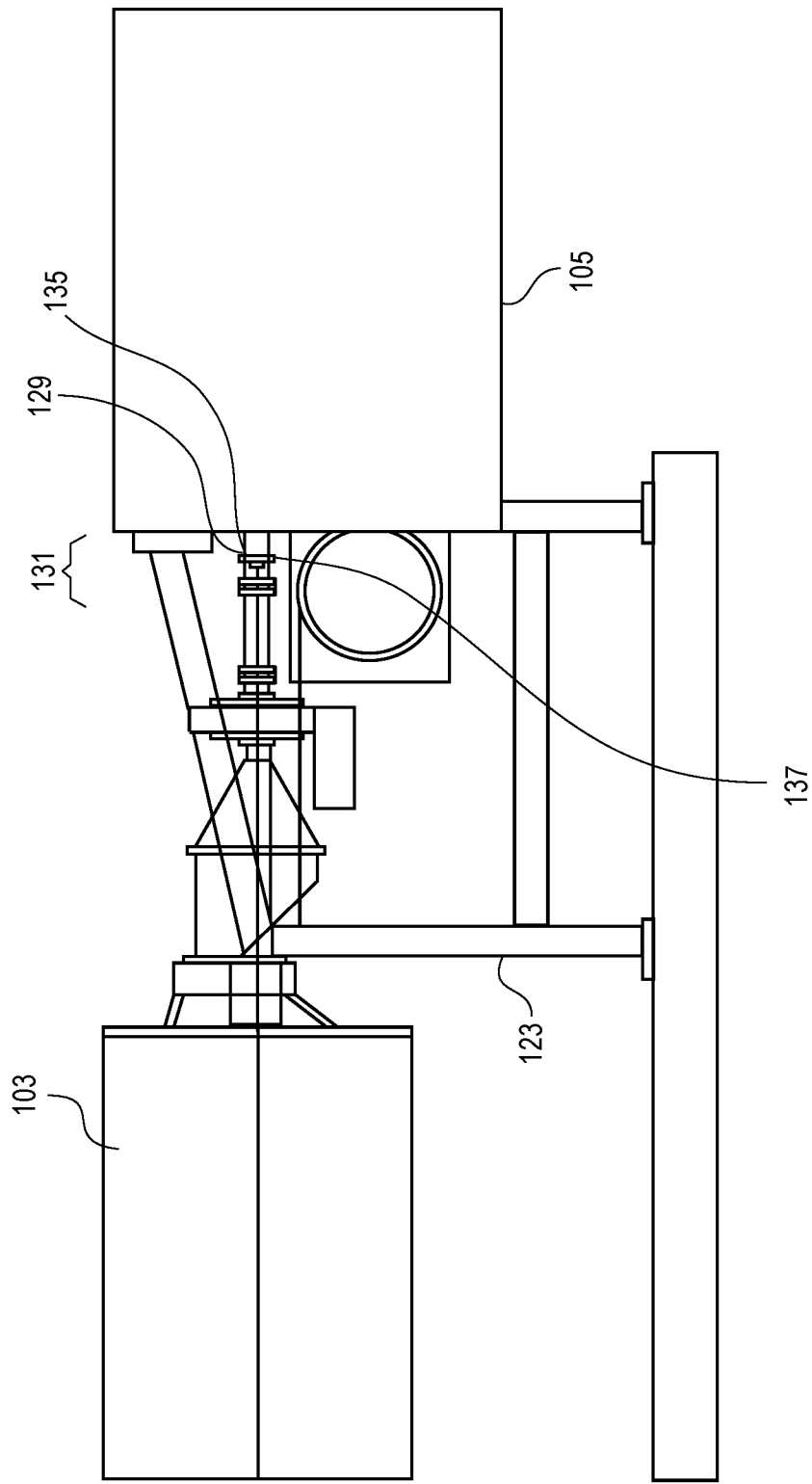
FIG. 4A is a simplified side elevational view of an embodiment of a closed-loop engine testing system.
Figure 4B:
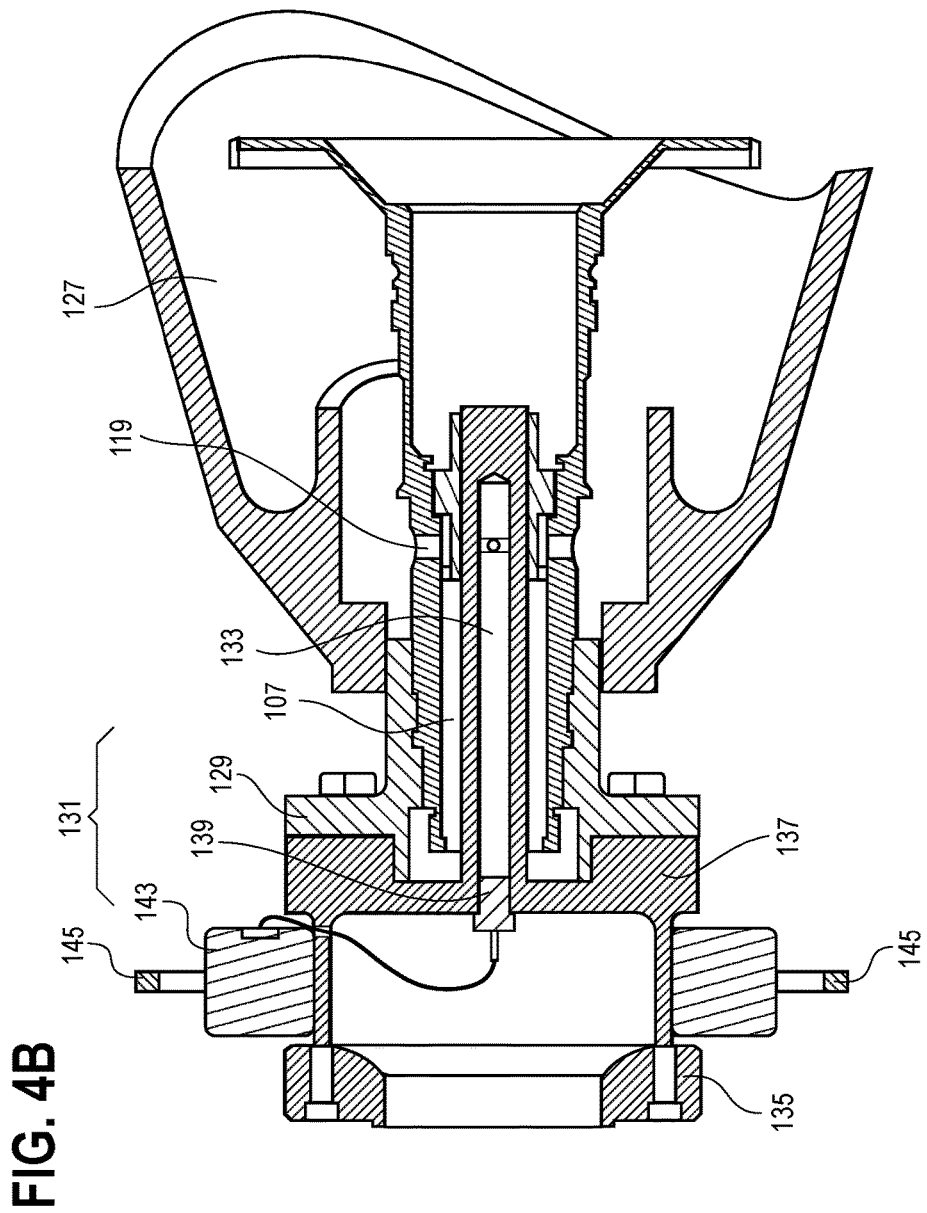
FIG. 4B is an enlarged fragmentary sectional view of a portion of the system of FIG. 4A.

Referring to FIG. 1, a block diagram shows the components of a closed-loop engine testing system 101. A dynamometer 103 is coupled to an engine 105 at a coupling interface 106. Many types of engines 105 may be tested according to the system 101 and principles disclosed herein including propulsion engines such as piston engines. Although various types of engines may be tested in a similar manner, for the purpose of illustration the type of engine 105 disclosed herein is a turboshaft or turboprop engine such as might be suitable for powering a helicopter or fixed-wing aircraft, respectively, or the like. (Hereinafter, the engine 105 may be referred to as a turboprop or turboshaft engine). An example engine that could be tested is a Rolls-Royce M250-B17 turboprop engine shown in FIG. 4A. Referring to FIGS. 4A and 4B, a power shaft 107 is rotatably coupled to the dynamometer 103 at the coupling interface 106. The dynamometer 103 is configured to provide a load to the turboshaft engine 105. Further, the dynamometer 103 is configured to accept the torque and speed developed by the turboshaft engine 105. In alternative embodiments, the dynamometer 103 is further configured to convert the power produced by the engine 105 into electricity. The electricity produced may be returned to the power grid or used elsewhere, such as in an associated engine production plant.

The dynamometer 103 may be used to determine the torque and power required during operation of the engine 105. The dynamometer 103 may be a driving dynamometer, an absorbing dynamometer, or both. In example embodiments, the dynamometer 103 accepts a load from the turboshaft engine 105 and the turboshaft engine 105 develops a particular torque to offset the load absorbed by the dynamometer and maintain a predetermined nominal rotational operating speed. The dynamometer 103 accepts more or less power as it reacts to changes in the power developed by the turboshaft engine 105.

Referring again to FIG. 1, an operational parameter of the engine 105 may be communicated to a dynamometer control 109 by one or more communication lines 110a. One or more communication lines throughout this disclosure may comprise wired or wireless connections. The dynamometer control 109 may utilize the engine operation parameter in programming 111 executed by the dynamometer control 109, described with particularity below and with reference to FIGS. 5 and 6. Specifically, the dynamometer control 109 develops a control signal for the dynamometer 103 in response to the engine operation parameter. The control signal is communicated to the dynamometer by one or more communication lines 110b. The control signal directs the dynamometer 103 to provide the necessary load on the engine 105 and accept a particular power and torque produced by the turboshaft engine 105.

Figure 2:
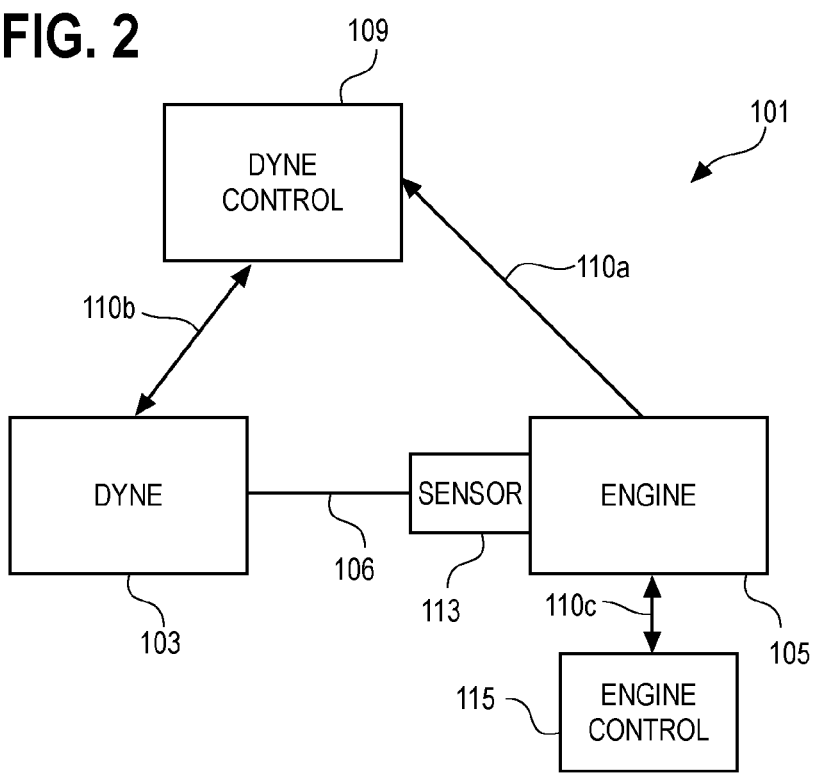
FIG. 2 is a block diagram of an alternative embodiment of a closed-loop engine testing system.

Referring now to FIG. 2, a block diagram shows the components of an alternative embodiment of the closed-loop engine testing system 101. The dynamometer control 109 develops the command signal for the dynamometer 103 in response to the processing of the engine operation parameter. In some embodiments, the engine operation parameter is measured by a sensor 113. In further embodiments, the sensed engine operation parameter is one of a number of parameters manipulated by an engine control 115. In these latter embodiments, the engine operation parameter may simply be responsive to a command signal developed by the engine control 115, in which case the sensor 113 may or may not be needed. The engine control 115 communicates control signals to the engine 105 by way of one or more communications lines 110c.

Figure 4C:
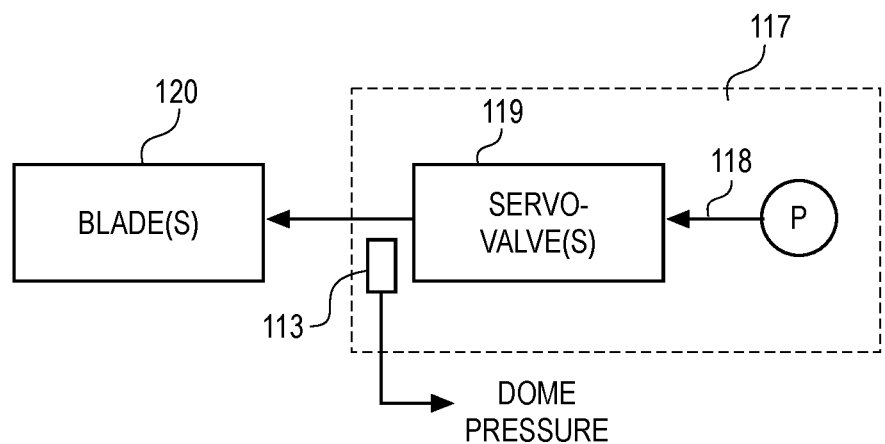
FIG. 4C is a simplified block diagram of a control system that controls the dynamometer of FIG. 4A during engine testing.

In an example embodiment seen in FIG. 4C, during engine testing, the sensed engine operational parameter comprises a propeller pitch (or blade angle) command signal developed by a control system 117. For example, the control system 117 commands the pitch of propeller blades coupled to and driven by the turboprop engine 105. In the illustrated turboprop engine, the pitch of the propeller is adjusted by way of a hydraulic system in which the propeller control system 117 includes a pump P and a governor disclosed hereinafter that in turn control the pressure of hydraulic fluid within passages 118 disposed in the propeller shaft 107. The passages 118 are in fluid communication with one or more actuators such as servovalves 119 that adjust the pitch of the propeller blades 120 in response to the controlled pressure. The passages in the propeller shaft 107 are in fluid communication with a propeller dome (not shown) and the hydraulic fluid pressure therein is referred to as a propeller dome pressure. In a further example embodiment, the hydraulic system is a combining governor. The combining governor includes a pump and a governing feature.

In an example application of the engine 105 for use as a turboshaft engine in a helicopter, the engine rotates at a fixed speed. When the helicopter pilot directs adjustment of either the vertical position of the helicopter or the acceleration/deceleration of the helicopter, or when the load on the engine otherwise changes, the parameter that is manipulated to maintain a constant speed is the angle of the rotor blades 120. Control of the angle of the rotor blades is provided in a manner similar to the propeller control system 117.

In the illustrated embodiment, the propeller dome pressure is detected by the sensor 113 and processed by the dynamometer control 109 to develop the control signal for the dynamometer 103. Specifically, the correlation between the propeller dome pressure and the power produced by the engine 105 is used to control the dynamometer 103 during simultaneous testing of the performance of the engine 105 and the functionality of the propeller control system 117 on a single test stand 123 only, as shown in FIG. 4A. This correlation is derived from the relationship between the propeller dome pressure, the blade pitch, and the power produced by the engine 105 in order to maintain nominal blade speed at a given blade pitch. Likewise, the engine 105 may be prepared for testing only one time, and the single test configuration of the engine 105 may be the same as that for final delivery of the engine 105. In fact, the engine 105 may be fitted with a propeller reduction gearbox and the propeller control system 117 during testing.

Figure 3:
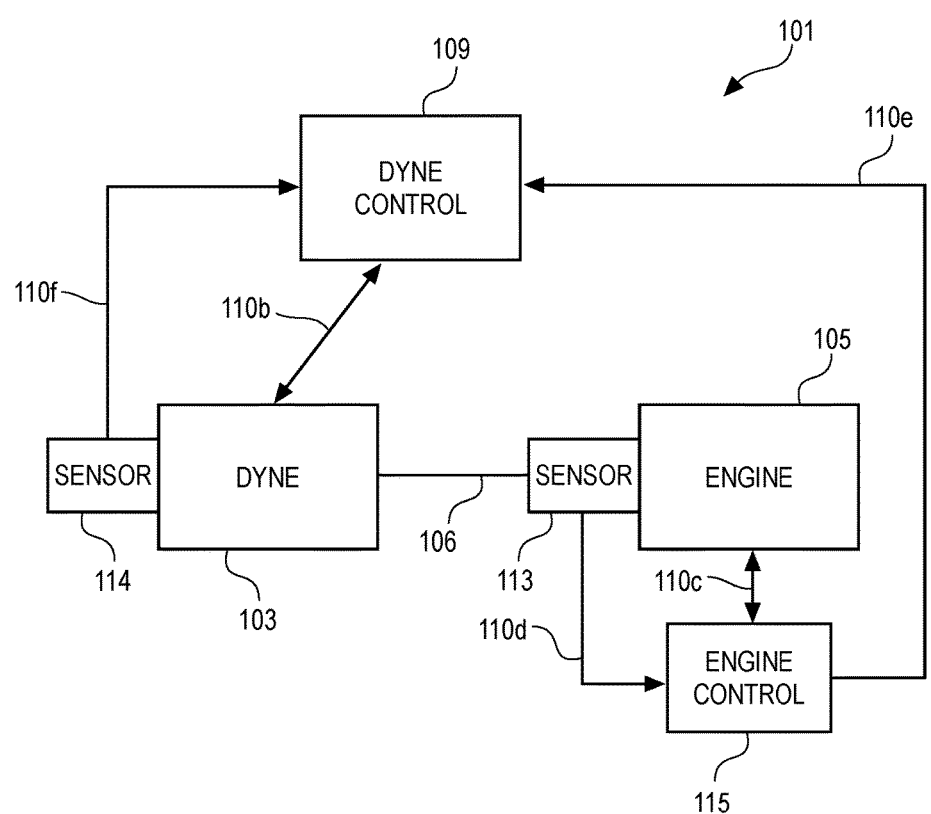
FIG. 3 is a block diagram of a still further alternative embodiment of a closed-loop engine testing system.
Figure 5:
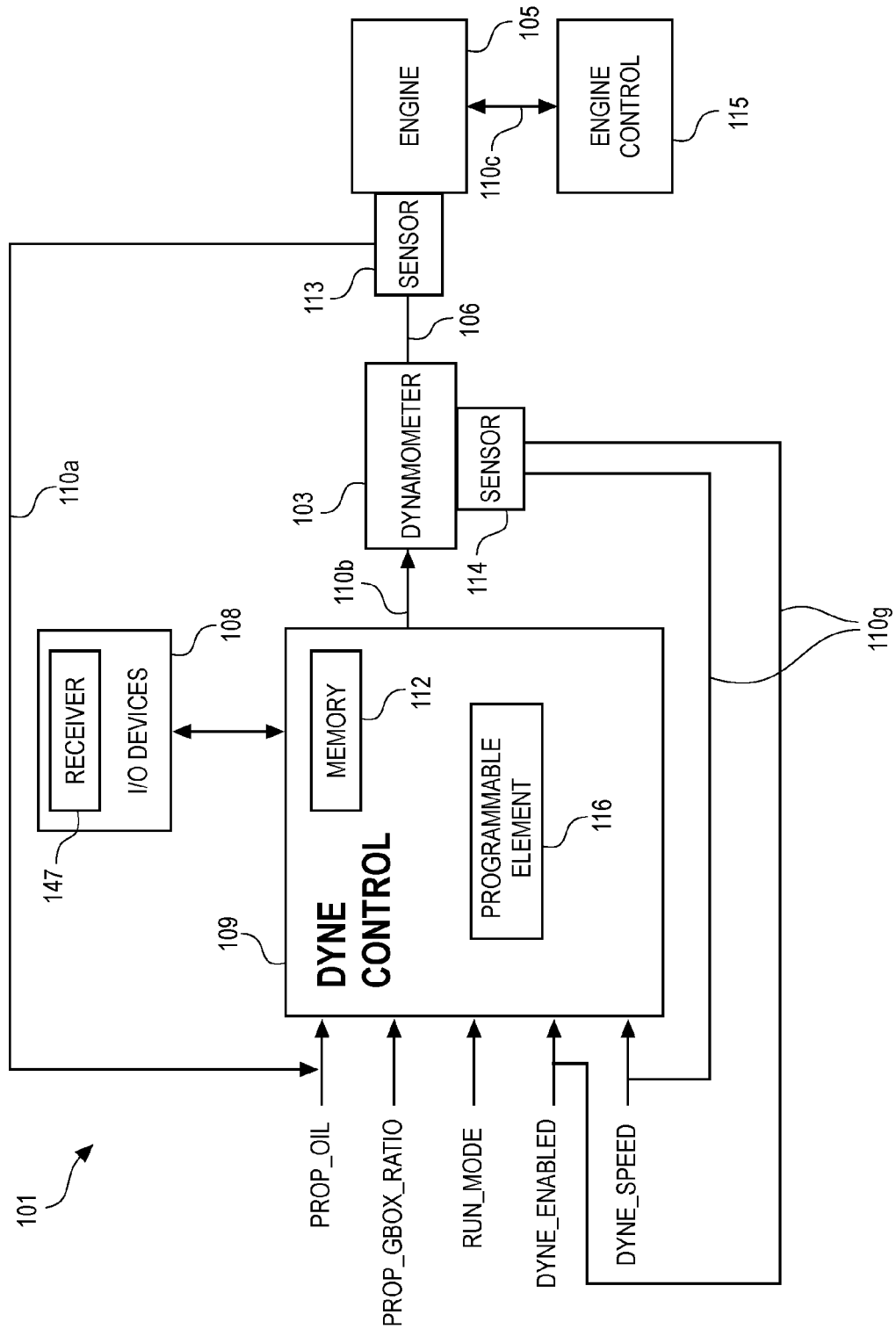
FIG. 5 is a detailed block diagram of an embodiment of a closed-loop engine testing system.

Referring now to FIG. 3, an alternative embodiment of the closed-loop engine testing system 101 is depicted. In this alternative embodiment, the sensor 113 communicates with the engine control 115 by way of communication line 110d, rather than directly with the dynamometer control 109. The engine control 115 is further in communication with the dynamometer control 109 by way of one or more communication lines 110e. Such an embodiment may allow the engine control 115 to use the hydraulic fluid pressure measurements further as feedback for control, diagnostics, or the like. Also shown in FIG. 3 is a second sensor 114. The sensor 114 may detect the dynamometer speed DYNE_SPEED as shown in FIG. 5 and communicate the measured dynamometer speed to the dynamometer control 109 by way of one or more communications lines 110f.

Referring now to FIG. 4A, the test stand 123 supports the dynamometer 103 and facilitates the coupling of the engine 105 with the dynamometer 103. In alternative embodiments, the test stand 123 may house at least a portion of the dynamometer control 109. As seen in FIG. 4B the test stand 123 may further house a receiver 147 and engine components, dynamometer components, and sensor components are also illustrated. The engine components include an engine propeller gearbox housing 127, a propeller shaft 107, and an engine output flange 129. The dynamometer components include a mating fixture 131 and a structural mount 135 that connects the engine output flange 129 to the dynamometer input flange 137. The sensor components include a center probe 133 and a pressure transducer 139.

The sensor of FIG. 4B is configured to measure the hydraulic fluid pressure at the center of the propeller shaft 107 wherein the pressurized hydraulic fluid is provided by the pump P and a governor. The center probe 133 has one end inserted into the propeller shaft 107 and the pressure transducer 139 is arranged at the other end of the center probe 133. The center probe 133 is in fluid communication with the hydraulic fluid supplied by the governor to the propeller shaft 107, and the pressure transducer 139 measures the pressure of the hydraulic fluid.

The engine, dynamometer, and sensor components depicted in FIG. 4B are rotating at the speed of the propeller shaft 107. Under nominal conditions, the engine 105 in this example operates at a rotational speed of 2030 revolutions per minute (RPM). Therefore, to communicate the hydraulic fluid pressure measurements to the dynamometer control 109, a wireless transmitter 143 may be provided. A wireless transmitter 143 is arranged on the rotating propeller shaft 107 and is in communication with the pressure transducer 139. The wireless transmitter 143 transmits measurement values to the receiver 147, as shown in FIG. 5, statically mounted to the test stand 123. In an example, the wireless transmitter 143 may utilize an antenna 145 to aid in wireless transmission. The antenna 145 may comprise a wire antenna including a statically mounted loop that encircles the wireless transmitter 143 and is optionally affixed to the test stand 123. The receiver 147 provides the measured hydraulic fluid pressure to the dynamometer control 109. The dynamometer control 109 processes the measurements of hydraulic fluid pressure to develop the load signal for the dynamometer 103 as discussed in relation to FIGS. 1, 2, and 3. The combination of the real-time measurement of the hydraulic fluid pressure and the wireless transmission of the measurement values while the engine 105 and dynamometer 103 components are rotating facilitates the closed-loop control method of the system 101.

Referring now to FIG. 5, the dynamometer control 109 is responsive to various signals, and includes analog and/or digital circuitry including, preferably, a programmable element 116, such as a processor, an application specific integrated circuit (ASIC), a programmable gate array, or any other suitable device(s). The control 109 is coupled to suitable input/output (I/O) devices 108, such as a display, a keyboard, a mouse or other pointing device, and the like to permit control and allow testing results to be observed. Further I/O devices may include the wireless receiver 147. The programmable element 116 is operatively coupled to memory 112 of suitable type. The control 109 is responsive to signals PROP_OIL representing the propeller dome pressure measured by the transducer 139, PROP_GBOX_RATIO indicating the current output gear box ratio of the engine, RUN_MODE representing whether the engine is currently operating in a normal run mode, DYNE_ENABLED indicating whether the dynamometer is currently enabled, and DYNE_SPEED representing the current speed of the dynamometer. The signals DYNE_ENABLED and DYNE_SPEED may be transmitted to the dynamometer control 109 by communication lines 110g. These signals are developed by the devices described above or by any other suitable command or sensing devices.

Referring now to FIGS. 6A-6E, a flow chart illustrates programming 111 for developing the control signal for the dynamometer 103. The programming 111 of FIGS. 6A-6E accepts the signals of FIG. 5 (i.e., PROP_OIL, PROP_GBOX_RATIO, RUN_MODE, DYNE_ENABLED, and DYNE_SPEED) and develops the command signal to direct the dynamometer 103 to produce a particular torque load on the engine 105 while ensuring that a normal and safe rotational speed is maintained by both the engine 105 and dynamometer 103 during testing. Further possible input signals include historical command signal data optionally stored in memory 112 such as past command signals and other I/O signals such as operator input and future/predicted torque requirements.

Figure 6A:
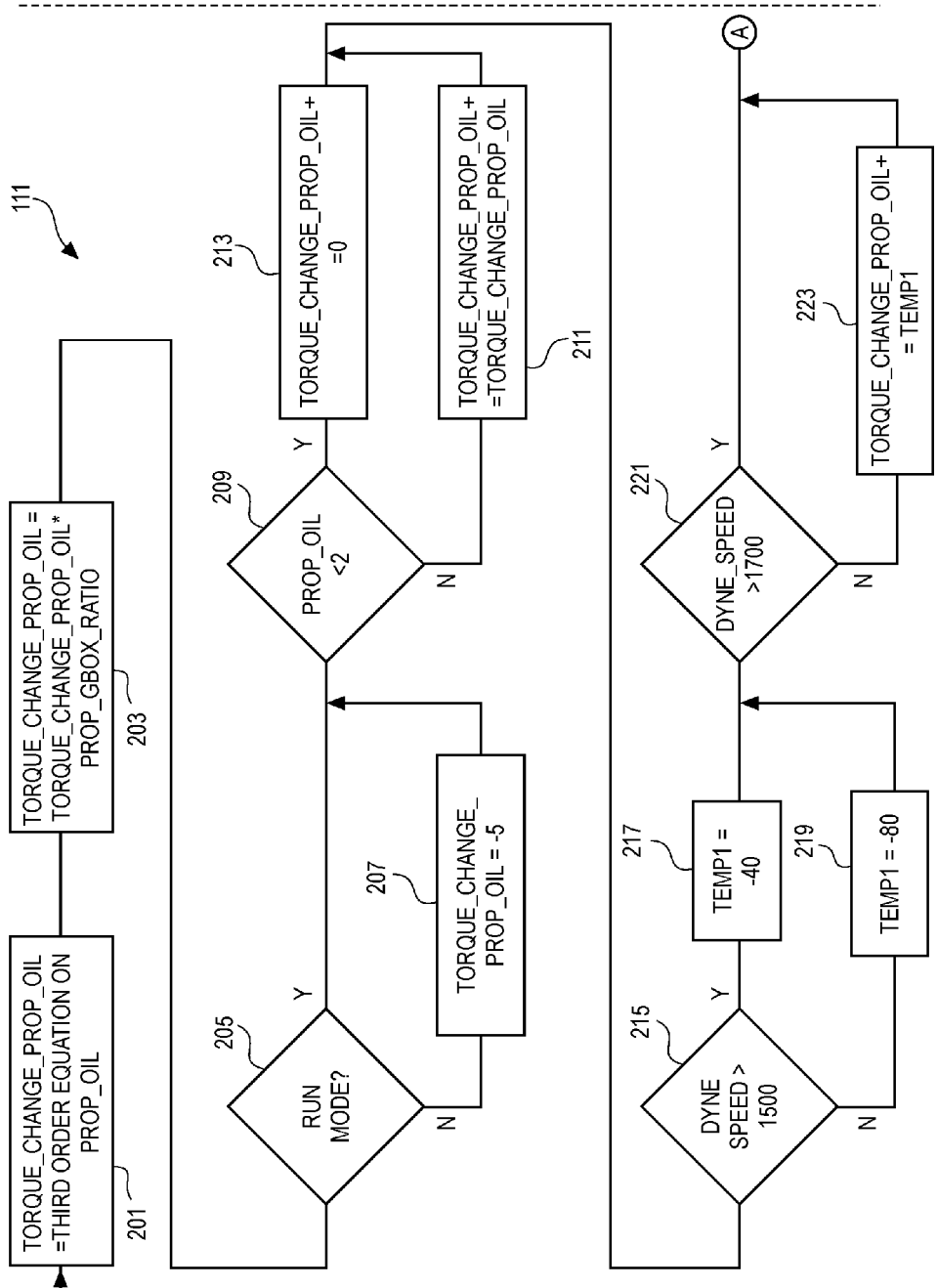
Figure 6B:
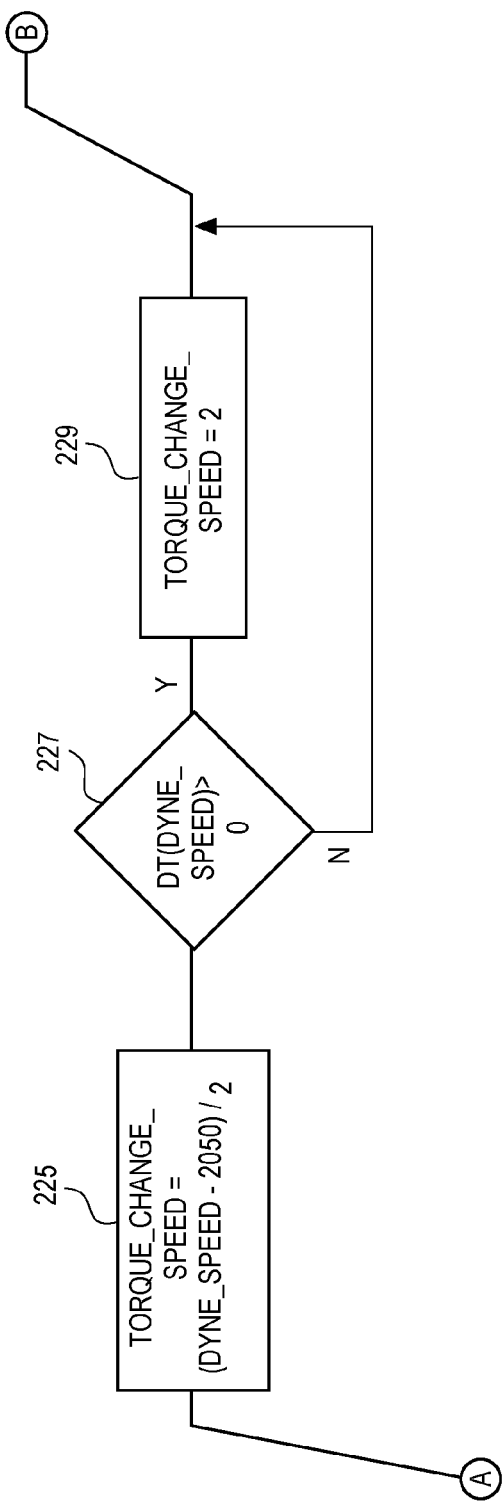
Figure 6D:
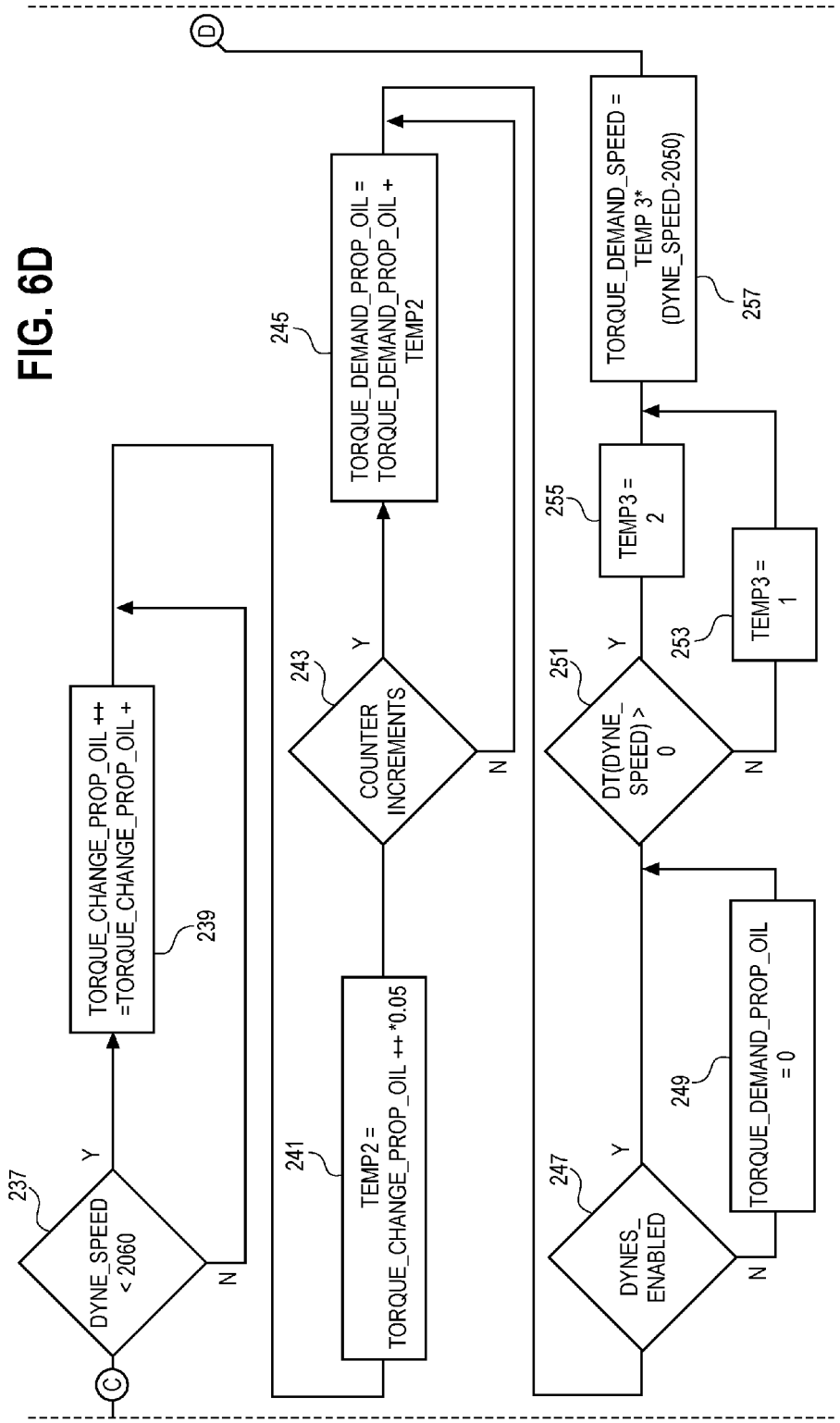

Referring now to FIG. 6A, block 201 sets the value of a signal TORQUE_CHANGE_PROP_OIL to the result of a third order equation performed on the measured value of PROP_OIL. In an embodiment, the third order equation is:

$$\text{TORQUE\_CHANGE\_PROP\_OIL} = (-0.00000359 * \text{PROP\_OIL})^3 + (0.0022073 * \text{PROP\_OIL})^2 - (0.44377206 * \text{PROP\_OIL}) + 29.1.$$

A block 203 then updates the value of TORQUE_CHANGE_PROP_OIL by dividing same by the magnitude of the signal PROP_GBOX_RATIO.

A decision block 205 determines whether the engine is being commanded to operate in a normal run mode by checking the status of the RUN_MODE input signal. If the RUN_MODE signal is true, then the value of TORQUE_CHANGE_PROP_OIL remains unchanged, however if the result of the query is false, then the value of TORQUE_CHANGE_PROP_OIL is set to the constant value −5 by a block 207. Next, a decision block 209 checks the value of the PROP_OIL input signal. If the value of the PROP_OIL signal is less than 2, then the value of a signal TORQUE_CHANGE_PROP OIL+ is set to zero by a block 213. Conversely, if the value of the PROP_OIL signal is not less than 2, then the signal TORQUE_CHANGE_PROP_OIL+ is set to the value of TORQUE_CHANGE_PROP_OIL by a block 211.

A decision block 215 thereafter queries the DYNE_SPEED input signal. It may be useful to query the DYNE_SPEED signal developed by the sensor 114 to apply thresholds and limits on the rotational speed of the dynamometer 103. Application of speed thresholds and speed limits may be useful as a safety check as well as providing desirable feedback to the dynamometer control 109. If the value of the DYNE_SPEED signal is greater than 1500, then the value of a temporary value, TEMP1, is set to −40 by a block 217, but if the value of DYNE_SPEED is not greater than 1500, then the value of TEMP1 is set to −80 by a block 219. Next, a decision block 221 again queries the DYNE_SPEED input signal. If the value of the DYNE_SPEED signal is greater than 1700, then the value of TORQUE CHANGE_PROP_OIL+ is not further updated, but if the value of the DYNE_SPEED signal is not greater than 1700, then the value of TORQUE_CHANGE_PROP_OIL+ is assigned the value of TEMP1 as determined by the decision block 215.

Following the blocks 221 and 223 a block 225 (FIG. 6B) sets the value of a variable TORQUE_CHANGE_SPEED to (DYNE_SPEED−2050)/2. Next, a decision block 227 queries a signal DT(DYNE_SPEED) representing the derivative of the signal DYNE_SPEED. If the value of DT(DYNE_SPEED) is greater than zero, then the value of a variable TORQUE_CHANGE_SPEED is set to 2 by a block 229. Alternatively, if the value of DT(DYNE_SPEED) is not greater than 2, then TORQUE_CHANGE_SPEED is not further updated and retains the value assigned to such variable by the block 225.

The programming flowchart continues with FIG. 6C at a decision block 231 that compares TORQUE_CHANGE_SPEED to TORQUE_CHANGE_PROP_OIL+. If TORQUE_CHANGE_SPEED is greater than TORQUE_CHANGE_PROP_OIL+ then the value of a variable TORQUE_CHANGE_PROP_OIL++ is set to the value of TORQUE_CHANGE_SPEED by a block 233. Conversely, if the block 231 determines that TORQUE_CHANGE_SPEED is not greater than TORQUE_CHANGE_PROP_OIL+ then TORQUE_CHANGE_PROP_OIL++ is set to the value of TORQUE_CHANGE_PROP_OIL+ by a block 235.

A decision block 237 thereafter again queries DYNE_SPEED. If DYNE_SPEED is less than 2060, then TORQUE_CHANGE_PROP_OIL++ is set to the value of TORQUE_CHANGE_PROP OIL+ by a block 239, but if DYNE_SPEED is not less than 2060, then TORQUE_CHANGE_PROP_OIL++ is not further updated. Next, a block 241 sets a temporary variable TEMP2 equal to the value TORQUE_CHANGE_PROP_OIL++*0.05. A block 243 thereafter checks whether a counter has incremented since the last time the counter was encountered during execution of the programming. In the illustrated embodiment, the counter increments every 40 milliseconds. If the counter has incremented, then processing block 245 updates the value of a variable TORQUE_DEMAND_PROP_OIL to the value of TORQUE_DEMAND_PROP_OIL+TEMP2. Otherwise, the value of TORQUE_DEMAND_PROP_OIL is not updated.

Next, a decision block 247 queries the DYNE_ENABLED signal. If the result of the query is true, then the value of TORQUE_DEMAND_PROP_OIL is not updated. If the result of the query is false, then the value of TORQUE_DEMAND_PROP_OIL is set to zero by a block 249. Thereafter, a block 251 queries DT(DYNE_SPEED). If DT(DYNE_SPEED) is not greater than zero, then the value of a temporary variable TEMP3 is set to 1 by a block 253, but if DT(DYNE_SPEED) is greater than zero, then TEMP3 is set equal to 2 by a block 255. A block 257 then sets the value of TORQUE_DEMAND_SPEED equal to TEMP3*(DYNE_SPEED−2050).

The programming flowchart continues at decision block 259 that compares TORQUE_DEMAND_SPEED to TORQUE_DEMAND_PROP_OIL. If TORQUE_DEMAND_SPEED is greater than TORQUE_DEMAND_PROP_OIL, then the value of a variable TORQUE_REQUEST is set to the value of TORQUE_DEMAND_PROP_OIL by a block 261. If the block 259 determines that TORQUE_DEMAND_SPEED is not greater than TORQUE_DEMAND_PROP_OIL, then the value of TORQUE_REQUEST is set to equal TORQUE_DEMAND_SPEED by a block 263. Next, a decision block 265 again queries the DYNE_SPEED signal. If DYNE_SPEED is greater than 2070, then TORQUE_REQUEST is not updated further, but if DYNE_SPEED is not greater than 2070, then TORQUE_REQUEST is set equal to the value of TORQUE_DEMAND_PROP_OIL by a block 267. A block 266 slew rate limits any change in TORQUE_REQUEST to obtain a slew rate limited TORQUE_REQUEST signal. An appropriate slew rate limit is 1000 units/second. Finally, a block 271 updates TORQUE_REQUEST equal to the slew rate limited value of TORQUE_REQUEST*PROP_GBOX_RATIO. The result of processing block 271 is the final control signal that is communicated to the dynamometer 103.

The embodiment(s) detailed above may be combined in full or in part, with any alternative embodiment(s) described.

INDUSTRIAL APPLICABILITY

In summary, the testing of engines, particularly turboshaft engines, is a time consuming and expensive process. However, present embodiments of the closed-loop engine testing system permit simultaneous evaluation of both the performance of an engine as well as the functionality of engine controls. Present embodiments may allow for the combination of plural testing configurations into a single testing configuration. Further, present embodiments may test the engine in a configuration that is the same as the configuration when the engine is delivered to an OEM or other customer.

The present embodiments include a pressure transducer that measures a hydraulic fluid pressure. The pressure transducer may observe the hydraulic fluid pressure in real time as well as transmit the measurements using wireless communication. The closed-loop aspect of embodiments of the testing system permits evaluation of a propeller control system and the power output of the engine simultaneously through sophisticated control of the dynamometer in response to measurements of the hydraulic fluid pressure manipulated by the propeller control system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A system for testing an engine, comprising:
   a dynamometer coupled to the engine and controlled with a control signal; and
   a control that derives the control signal from an operation parameter of the engine by
      measuring a hydraulic fluid pressure of a propeller control,
      comparing the hydraulic fluid pressure with a past hydraulic fluid pressure and a requested hydraulic fluid pressure, and
      deriving the control signal from the comparison.

2. The system of claim 1, wherein the hydraulic fluid pressure is measured in real time.

3. The system of claim 2, wherein the control includes a pressure transducer disposed proximal to a location at which the engine is coupled to the dynamometer wherein the real-time measurement of the hydraulic fluid pressure is undertaken by the pressure transducer.

4. The system of claim 3, wherein the pressure transducer is in wireless communication with the control and the control signal is based on control of the hydraulic fluid pressure.

5. The system of claim 1, wherein the propeller control and engine performance are tested simultaneously.

6. The system of claim 1, wherein the control comprises a closed-loop control.

7. The system of claim 1, wherein the dynamometer converts into electricity the power developed by the engine.

8. The system of claim 1, wherein the system tests the propeller control of the engine without a propeller.

9. A method for testing an engine, comprising:
   coupling the engine to a dynamometer;
   controlling the dynamometer with a control signal; and
   deriving the control signal from an operation parameter of the engine by
      measuring a hydraulic fluid pressure of a propeller control, comparing the hydraulic fluid pressure with a past hydraulic fluid pressure and a requested hydraulic fluid pressure, and deriving the control signal from the comparison.

10. The method of claim 9, further comprising:

measuring the engine operation parameter in real time.

11. The method of claim 10, wherein a pressure transducer is embedded proximal to a location at which the engine is coupled to the dynamometer; and further comprising:

transmitting the measured engine operation parameter to the dynamometer.

12. The method of claim 9, further comprising:

testing the propeller control and engine performance simultaneously.

13. The method of claim 9, wherein the control signal is derived by a closed-loop control system.

14. The method of claim 9, further comprising:

converting the power developed by the engine into electricity.

15. The method of claim 9, further comprising:

simulating a propeller load by deriving the control signal from one or more of: the hydraulic fluid pressure, the past hydraulic fluid pressure, and the requested hydraulic fluid pressure.

16. The method of claim 9, further comprising:

testing the propeller control of the engine without attaching a propeller to the engine.

* * * * *